Patented Mar. 6, 1928.

1,661,245

UNITED STATES PATENT OFFICE.

HARRY M. WILLIAMS, OF DAYTON, OHIO, ASSIGNOR TO GENERAL MOTORS RESEARCH CORPORATION, OF DAYTON, OHIO, A CORPORATION OF DELAWARE.

BEARING COMPOSITION.

No Drawing.  Application filed May 22, 1923. Serial No. 640,796.

The present invention relates to bearing metal compositions and machine members or other articles made therefrom and in its preferred form, chosen for the purpose of this description, the invention relates specifically to bearing alloys for use as sleeves or bushings in plain bearings.

In the common form of plain bearing sleeves or bushings the metal used is Babbitt metal or phosphor bronze, but these are open to certain objections. The bronze is difficult to fit properly owing to the fact that embedded in the copper-tin-alloy are very hard particles or crystals of a copper-tin chemical compound $Cu_3Sn$ which rapidly dulls cutting tools. The Babbitt metal is easier to work but cannot be subjected to very high bearing pressures before beginning to flow. Babbitt also contains the so-called bearing points or hard crystals embedded in the softer alloy of tin, lead and antimony, which crystals act as the real support of the shaft mounted in the babbitt lined bearing. The greater part of the hard crystals in Babbitt metal are formed of a chemical compound of tin and antimony which may be represented by the formula SnSb. There is also present, when copper is one of the constituents of the babbitt, a number of the crystals of the copper-antimony chemical compound $Cu_3Sb$ which is somewhat harder than SnSb though not so hard as $Cu_3Sn$.

These facts together with the fact that cast bronze or babbitt bushings are not oil-absorbent present the chief objections to the known plain bearings.

Among the objects of the present invention, therefore, is the overcoming of these objections by combining good features of both bronze and Babbitt metal and eliminating some of the objectionable ones. To state the same thing in other words, one object of the invention is to produce a bushing having babbitt bearing surface and working qualities with more nearly the strength and resistance to pressure of bronze.

Another object is to greatly improve the lubrication of such plain bearings by making the bushings more or less oil-absorbent.

These and other objects will be more readily apparent as the description proceeds.

In producing bushings or sleeves according to the present invention there is first produced a combination of tin and antimony of substantially equal proportions by melting the metals together. This operation produces the above mentioned tin-antimony compound represented by the formula SnSb, and when produced in this manner the compound is a rather hard (the Shore sceleroscope test shows about 30 to 33) brittle material which can be ground easily to a fine powder.

After thus producing the compound, it is ground to pass a 200 mesh sieve and is then ready to incorporate with the other constituents to produce the bushing.

A specific example of the proportions of materials used and the procedure followed is as follows:

An intimate mixture is made of the fine powders of

|  | Parts. |
|---|---|
| Copper | 77.0 |
| Tin | 4.5 |
| SnSb | 13.5 |
| Graphite | 5.0 |

Preferably all of these powders should be of a sufficient degree of fineness to pass a 200 mesh sieve.

After mixing the powdered materials, a sufficient quantity of the mixture is put into a die and compressed to the desired form under a pressure of about 80,000 pounds per square inch. The molded article, for example, a bushing, is then packed in carbonaceous material and heated to a temperature of about 1150° F. for a period of about five hours. Somewhat higher sintering temperature will be found advisable when using $Cu_3Sn$ or $Cu_3Sb$ in the place of SnSb, otherwise the process is substantially the same.

During the heating, the copper and tin alloy or unite to produce a bronze and this forms a matrix in which the SnSb and graphite are firmly embedded. Also, on account of the impossibility of entirely eliminating the air trapped between and among the particles and the fact that the mass is not fused, the product is more or less porous and will absorb up to several per cent of its weight of oil. So that a product is obtained which is a great deal stronger than Babbitt metal but yet has the bearing qualities of babbitt. In addition, the porosity materially assists in lubrication.

It is of course obvious that the above proportions are merely by way of example and these may be changed to vary the amount of SnSb or any of the other constituents. Further, other metals may be added or substituted for those mentioned. A smaller or larger proportion of lead will make a somewhat softer matrix alloy. An addition of a volatile spacing material like salicylic acid may be made to increase the porosity. And ammonium chloride may be used together with or as a substitute for salicylic acid, in order to facilitate the alloying and improve the physical properties of the product.

It is also obvious that other substances than the compound SnSb may be used in the place thereof if conditions call for them. For example, under some conditions it is desirable to substitute the $Cu_3Sn$ compound and embed this in a matrix of softer copper-tin-alloy. Or the compound $Cu_3Sb$ may be used. These latter compounds have been used to prepare satisfactory bushings and are to be considered as coming within the purview of the claims.

While the forms of embodiments of the invention as herein disclosed, constitute preferred forms, it is to be understood that other forms might be adopted, all coming within the scope of the claims which follow.

What I claim is as follows:

1. The process of producing porous bodies capable of absorbing liquid and having a surface adapted to be used in rubbing contact with another body, which consists in mixing fine metallic particles comprising copper and tin, capable of cohering when subjected to relatively high temperatures, with finely divided particles of a chemical compound of tin and antimony; molding the mixture under high pressure into the desired form, and heating the molded form to a temperature and for a length of time sufficient to effect cohesion of the said metallic particles.

2. A process of producing bearing metal and the like which comprises forming a chemical compound of tin and antimony, reducing this to a fine state of subdivision, intimately mixing the so reduced compound with finely divided bronze alloy constituents, molding the mixture under high pressure and heating the molded article to a temperature sufficient to induce union of the alloy constituents.

3. A bearing bushing consisting of bronze having the bearing points of "Babbitt" metal uniformly distributed and embedded in its bearing surface.

4. A bearing bushing consisting of porous bronze having the bearing points of "Babbitt" metal uniformly distributed and embedded in its bearing surface.

5. The process of producing porous bodies capable of absorbing liquid and having a surface adapted to be used in rubbing contact with another body, which consists in mixing finely divided alloyable metals with finely divided particles of a metal of greater wear-resisting capacity and with a finely divided volatile spacing material; compressing the mixture to the desired form; and heating the molded form for a time and at a temperature sufficient to effect alloyage of the metal particles.

6. The process of producing porous bodies capable of absorbing liquid and having a surface adapted to be used in rubbing contact with another body, which consists in mixing finely divided alloyable metals with finely divided particles of a metal of greater wear-resisting capacity and with finely divided salicylic acid; compressing the mixture to the desired form; and heating the molded form for a time and at a temperature sufficient to effect alloyage of the metal particles.

7. The process of producing porous bodies capable of absorbing liquid and having a surface adapted to be used in rubbing contact with another body, which consists in mixing finely divided alloyable metals with finely divided particles of a metal of greater wear-resisting capacity and with finely divided salicylic acid and ammonium chloride; compressing the mixture to the desired form; and heating the molded form for a time and at a temperature sufficient to effect alloyage of the metal particles.

In testimony whereof I hereto affix my signature.

HARRY M. WILLIAMS.